United States Patent [19]

Jacquel

[11] Patent Number: 4,499,463

[45] Date of Patent: Feb. 12, 1985

[54] APPARATUS FOR CONTROLLING ELECTRICAL RECEIVERS OCCUPYING AT LEAST TWO STATES

[75] Inventor: Dominique Jacquel, Marnaz, France

[73] Assignee: Somfy, France

[21] Appl. No.: 396,337

[22] Filed: Jul. 8, 1982

[30] Foreign Application Priority Data

Jul. 28, 1981 [FR] France ............................... 81 14623

[51] Int. Cl.$^3$ .............................................. H04Q 9/00
[52] U.S. Cl. .......................... 340/825.52; 340/825.57; 340/825.18; 340/825.51; 318/548
[58] Field of Search ...................... 340/825.52, 825.51, 340/825.18, 825.57; 318/548

[56] References Cited

U.S. PATENT DOCUMENTS 3,993,977  11/1976  Gilbert .......................... 340/825.18
4,016,369  4/1977  Pedersen ........................ 340/825.52

Primary Examiner—Donald J. Yusko
Attorney, Agent, or Firm—Darby & Darby

[57] ABSTRACT

The present invention relates to a control installation for several electrical receivers, such as motors for example, able to occupy at least two states. Each installation comprises individual control devices respectively associated with receivers and a general control device able to control all the receivers.

The control installation comprises, in each individual control device, a logic processing unit comprising, on the one hand a first group of input terminals to which are connected the switching means of the corresponding individual control device, on the other hand output terminals connected through the intermediary of output interfaces to the corresponding receiver. The switching means of the general control device are connected to a second group of input terminals of the logic processing unit, through the intermediary of an input interface. Each logic processing unit is provided, on the one hand in order to accept in succession commands given nonsimultaneously by the corresponding individual control device or by the general control device, on the other hand in order to accept solely the command given by the general control device, as long as this command is given simultaneously with a command from the corresponding individual control device.

6 Claims, 6 Drawing Figures

APPARATUS FOR CONTROLLING ELECTRICAL RECEIVERS OCCUPYING AT LEAST TWO STATES

The present invention relates to installations for controlling several electrical devices or receivers each able to occupy at least two states. These electrical receivers may be for example motors, heating resistors, light bulbs. These installations comprise individual control means or devices connected to a power supply, which devices are associated respectively with receivers or groups of receivers. These individual control devices each comprise switching means, intended to control at will the positioning of the corresponding receiver, in any one of its states and through the intermediary of a common control line are controlled by a general control means or device. The latter, connected to the power supply, comprises switching means intended to control at will the positioning of all the receivers, in any one of their states.

In known control installations of this type, such as that described in French Pat. No. 2 371 799, the structure of the general control device is relatively complicated, since it requires the use of a relatively bulky control box containing in particular a d.c. power supply device, relays, logic circuits, a delay device and three switching means, one of which is for the "STOP" function. These three switching means also exit in each of the individual control devices in which, moreover, the command given to the corresponding receiver by the switching means of the said individual device is not delayed. This is a drawback in the case where the receiver is constituted by an electric motor provided for actuating a blind or sliding shutter for example. In fact, where this motor is actuated by an individual control device, ther is a danger of its being supplied with voltage indefinitely if it should happen that its automatic stopping device is defective. In addition, in the case where one actuates the switching means of the general control device in a certain position (corresponding to the ascent for example) for all the receivers and where one then wishes to actuate the switching means of any one of the individual control devices, in the contrary position (corresponding to the descent in this example), an action of this type on the switching means has no effect throughout the implementation of the delay period initiated previously by the action on the control box of the general control device.

On the other hand, in the case where the general control device comprises external pick-ups intended to control the switching means of the said device automatically, these external pick-ups have an action which always takes priority with respect to an action on the switching means of the individual control devices. This is certainly of value in the case where the pick-up corresponds to a function which must absolutely always take priority (wind speed function for example, in the case where the receiver is a motor for driving a blind). It is a drawback in other cases where the function should not always take priority. Thus for example, when the pick-up is a solar cell giving a command to a general control device associated with motors for blinds, it is not possible to give a command to the contrary, through the intermediary of one of the individual control devices, as long as the delay period, initiated by the control box of the general control device, has not elapsed fully.

Finally, the connection lines are relatively complicated since, in addition to the mains supply lines of each receiver, there exists between the general control device and the individual control devices, a line for controlling two conductors and a d.c. supply line for two other conductors.

The control installation according to the invention is characterised in that each individual control device comprises a logic processing unit permanently connected to the power supply and comprising, on the one hand, a first group of input terminals, comprising at least one input terminal, to which are connected the switching means of the said individual control device, on the other hand, output terminals connected through the intermediary of at least one output interface to the corresponding receiver. The switching means of the general control device are connected to a second group of input terminals provided on each logic processing unit, through the intermediary of an input interface provided in each individual control device.

Each logic processing unit is provided, on the one hand in order to accept in succession commands given nonsimultaneously by the corresponding individual control device or by the general control device, on the other hand in order to accept solely the command given by the general control device, as long as this command is given simultaneously with a command from the corresponding individual control device.

According to one embodiment of the invention, each logic processing unit is constituted by a microcalculator containing in its non-volatile memory a scanning programme, a memory programme and a control programme for the commands given by the control devices, operating sequentially. The scanning programme is provided for collecting, from the first group of input terminals, the information relating to the position of the switching means of the corresponding individual control device and from the second group of input terminals, the information relating to the position of the switching means of the general control device. The memory programme is provided for memorizing these positions of the switching means. The control programme for the commands given is provided for determining the fact that the order comes or does not come from the general control device and if the answer is in the affirmative for implementing the command immediately without determining if there was also a command coming from an individual control device, if the answer is in the negative for implementing the command given by the corresponding individual control device.

According to another embodiment, each logic processing unit is constituted by a logic circuit comprising a logic circuit for the position of the switching means, connected to a priority logic circuit provided for determining, amongst the commands given by the switching means, the one which is to be accepted in the case where several commands are given simultaneously. This priority logic circuit is connected to a memory logic circuit provided for memorizing the command accepted and controlling or not controlling one of the output terminals of the logic circuit.

According to certain embodiments in which the general control device comprises priority logic, provided for establishing priority between several commands given by several pick-ups, the priority logic is provided for automatically actuating the switching means of the general control device, during a period which is respectively greater than or less than a predetermined value.

According to certain embodiments, the means for controlling the individual control device comprise at least one additional switching means provided for causing the corresponding logic processing unit, in a certain position, to refuse a command given by the general control device, if the duration of this command is less than a predetermined value.

According to certain embodiments in which the receivers are constituted by electric motors controlling in particular blinds, sliding shutters or the like, which motors comprise an automatic stopping device and delay means provided for stopping them in the case of unsatisfactory operation of the said automatic stopping device, each individual control device comprises individual delay means provided in order to be actuated each time the rotation of the corresponding motor is controlled by the said individual control device or by the general control device.

The present invention proposes to facilitate the construction of a control installation which does not have the drawbacks of the known prior art, is of relatively simple and non-bulky structure, whereof the operation of more reliable, which makes it possible to actuate each of the receivers always instantaneously and which ensures the desired implementation priority for each function.

In fact, as regards the simplicity of construction and low bulk, it should be noted that the general control device is extremely simplified and comprises neither bulky d.c. power supply device, nor relays, nor logic circuits, in its simplest version and that the number of its switching means has been reduced. The general control device is thus able to be contained completely in the casing of small bulk, containing its switching means. Each individual control device is also simplified, in particular by the reduction in the number of its switching means and by the reduction in the number of leads which connect it to the general control device.

The operation of the control installation is more reliable since, even in the case where the receiver is constituted by an electric motor arranged to be stopped by an automatic stopping device, stopping of the motor is ensured by the corresponding individual control device or by the general control device, even if the automatic stopping device fails.

Likewise, each of the receivers may be actuated instantaneously through the intermediary of the corresponding individual control device, even if the reverse command has been given previously to the same receiver through the intermediary of the general control device, except if the command given by the latter takes priority. The control installation thus ensures the desirred priority of implementation for each function, the external pick-ups having an action which takes priority in certain cases only.

Certain variations have additional advantages. They make it possible to choose, for each receiver, in addition to the "automatic" mode of operation, a "non-automatic" (manual) mode of operation when the general control device is able to be actuated by external pick-ups, certain of which do not take priority. This "non-automatic" mode of operation, which may be chosen individually by each individual control device, makes it possible to refuse a command given by a pick-up which does not take priority, whilst continuing to accept a command given by a pick-up which takes priority or by the individual control device.

The accompanying drawings illustrate, by way of example, embodiments according to the present invention.

Figure 1:
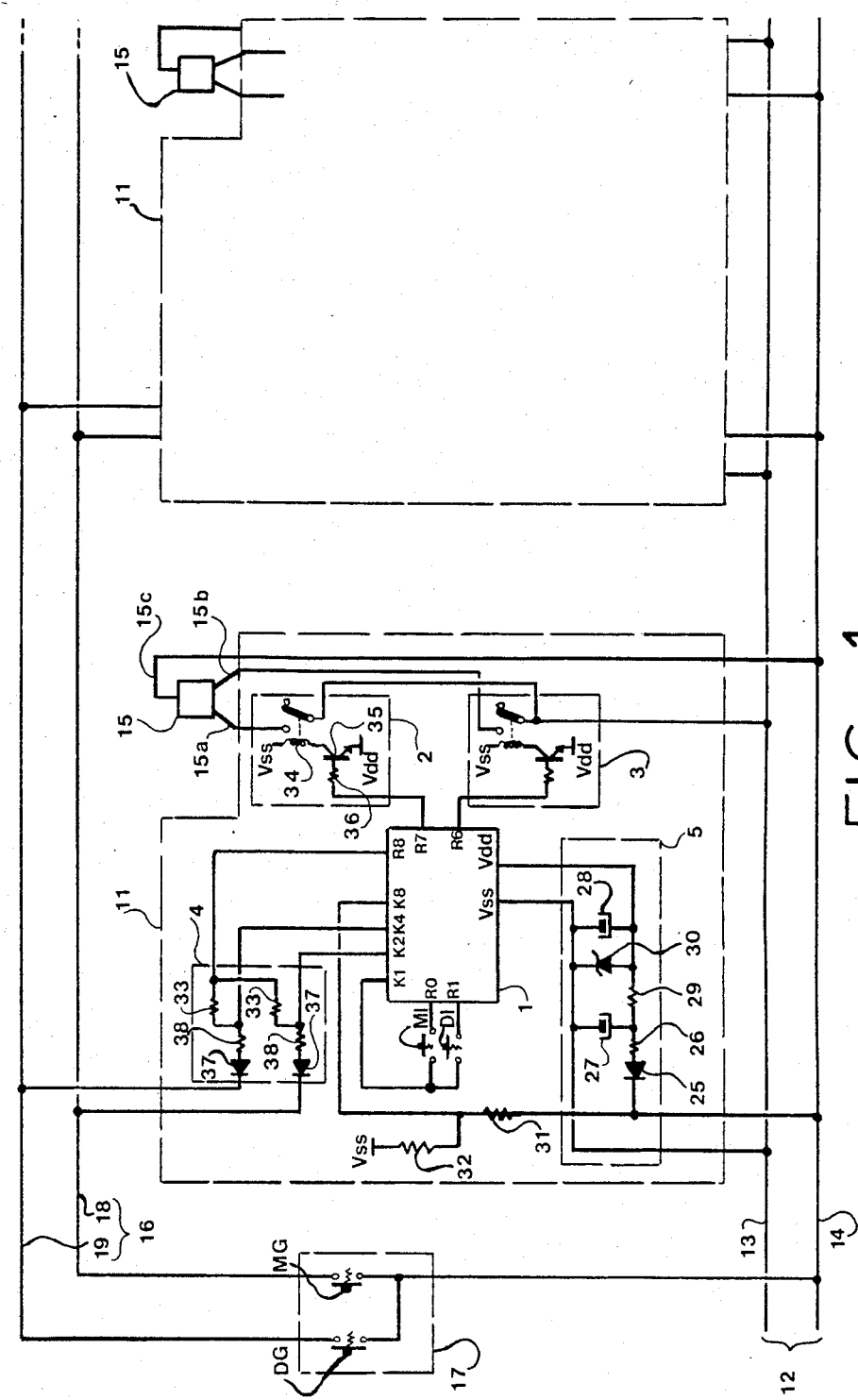
FIG. 1 shows the wiring diagram of a first embodiment of the invention.

As illustrated in FIG. 1, the control installation, to which the invention relates, comprises individual control devices 11 connected to the a.c. power supply system 12, by two leads 13,14. These devices 11 are respectively associated with electrical receivers 15. Each of these individual control devices 11 comprises a logic processing unit constituted in this example by microcalculator 1 (for example TMS 1000 of Texas Instruments) connected to the leads 13,14 by an individual power supply circuit 5 and two output interfaces 2,3 connected to the receiver 15 which in this example is constituted by an electric motor. Each interface 2,3 is provided in order to control the rotation of the motor, in one of the two directions of rotation of the latter. Each individual control device 11 is connected to a common control line 16 through the intermediary of an input interface 4. The control installation also comprises a general control device 17 connected, on the one hand to the power supply system 12, on the other hand to the common control line 16 comprising two leads 18 and 19.

The microcalculator 1 comprises two power supply terminals Vss and Vdd, input terminals K1,K2,K4,K8 and output terminals R0, R1,R6,R7,R8.

Each individual control device 11 comprises switching means constituted, in this example, by two switches MI (ascent), DI (descent) each having a working position and an inoperative position. In this example it is a question of push button switches having a momentary working position. Their first terminals are connected respectively to the outputs R0 and R1 of the microcalculator 1 and their second terminals are connected together to the input terminal K1.

Each individual power supply circuit 5 is intended to supply the corresponding microcalculator 1 with direct current. It is constituted for example by a rectifying diode 25 and a ballast resistor 26 and a regulating and filtering device comprising two capacitors 27 and 28, a resistor 29 and a Zener diode 30. A device of this type is known per se. In our example, the lead 13 is connected directly to the terminal Vss of the microcalculator 1 and the lead 14 is connected, through the intermediary of the diode 25 and the resistors 26 and 29 to the terminal Vdd.

The input terminal K8 of the microcalculator 1 is connected to the lead 14 by means of a system of resistors 31, 32 serving to cause the voltage at the said input K8 to drop to a value compatible with the input voltage specifications of the terminal K8. In this example, this connection makes it possible to use the alternating power supply system as a time base for counting the operating delay of the motor 15.

Each input interface 4 comprises for example a diode 37 whereof the cathode is connected to the lead 18 and whereof the anode is connected, by means of a resistor 38, to the input terminal K2 and, by means of another resistor 33, to the output terminal R8. Similar members are arranged between the lead 19 and the input K4 as well as the output R8. The function of each diode is to take solely the negative alternative of the supply voltage 12 switched by the switches MG and DG. The resistors 33 and 38 are intended to cause the supply voltage 12 to drop to a value compatible with the input voltage specifications of the terminals K2 and K4.

Each output interface 2 comprises for example a relay 34 comprising an inoperative contact and a working contact, the latter controlling the rotation of the motor in a certain direction. The common point of the contacts of the relay 34 is connected to the lead 13. The coil of the relay 34 is connected on the one hand to the terminal Vss of the microcalculator 1, on the other hand to the collector of a transistor 35, whereof the emitter is connected to the terminal Vdd and the base is connected to the output terminal R7 through the intermediary of a resistor 36.

Each output interface 3 is connected in a similar manner to that of the interface 2 and controls the rotation of the motor in the opposite direction to the former. The base of its transistor 35 is connected to the terminal R6.

The first terminal 15a of the motor 15 is connected to the working contact of the relay 34 of the interface 2. The second terminal 15b of the motor 15 is connected to the working contact of the relay 34 of the interface 3. The third terminal 15c of the motor 15 is connected to the lead 14.

The general control device 17 comprises, in this example, two switches MG (ascent), DG (Descent) each having a working position and an inoperative position. In this example the latter are push button switches with a momentary working position. Their first terminals are connected respectively to the leads 18 and 19 of the common control line 16 and their second terminals are connected together to the lead 14.

The microcalculator 1 comprises a non-volatile memory which contains a scanning programme 41, a memorizing programme 42, a test programme 43, a programme for controlling the commands received 44, a programme for processing the command accepted 45, a programme for processing the last command accepted 47 and a delay programme 46.

Figure 2:
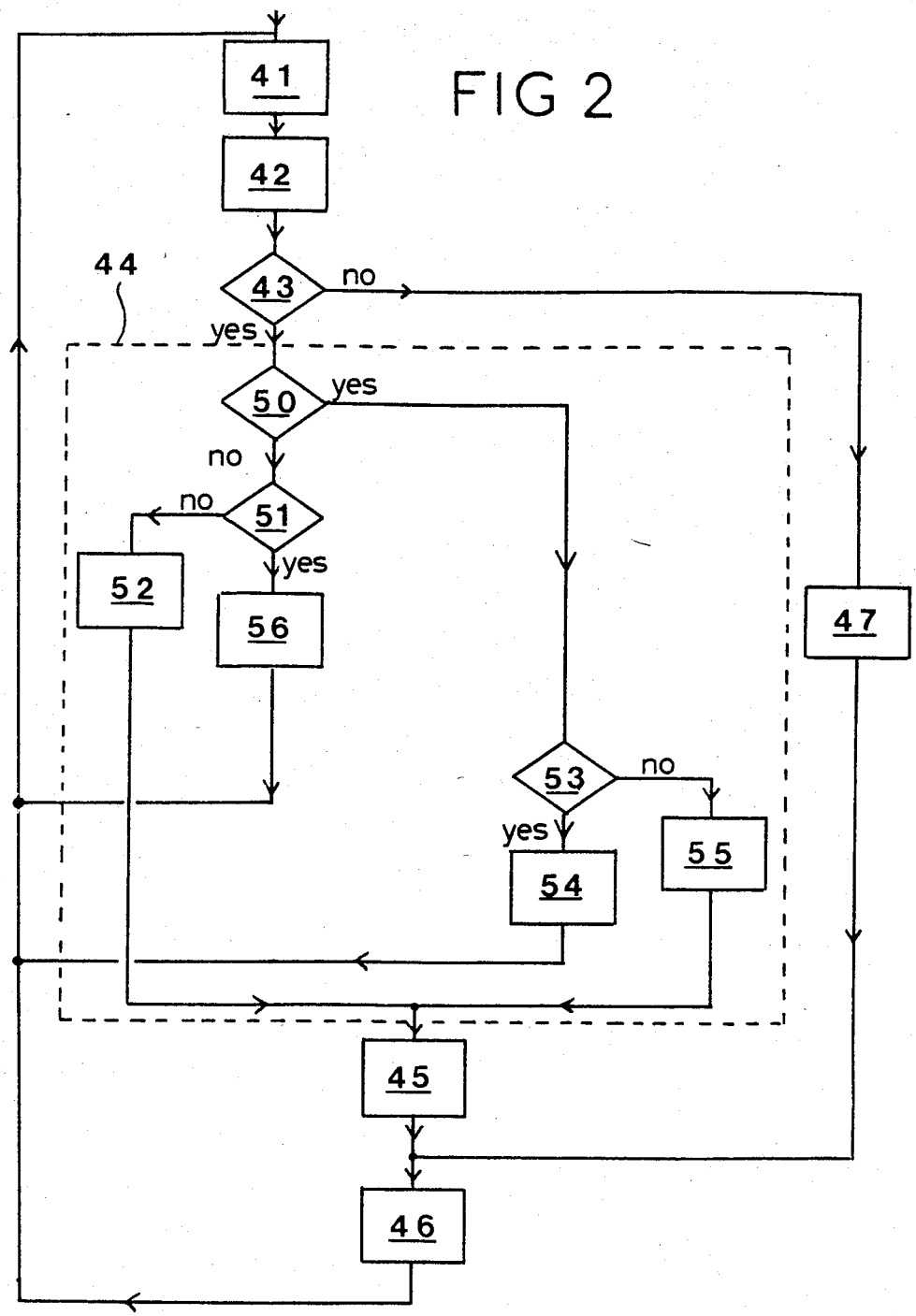
FIG. 2 is a diagram of the programmes contained in the nonvolatile memory of the microcalculator constituting the logic processing unit, in the same first embodiment.

As illustrated in FIG. 2, the programme 41 for scanning the open or closed position of each of the switches MI, DI, MG, DG comprises instructions whereof the last precedes the first instruction of the programme 42 for memorizing these positions. The last instruction of this programme 42 precedes the first instruction of the test programme 43 which ascertains the fact that at least one switch has been actuated. The last instruction of the programme 43 is a conditional call instruction to the address of the first instruction of programme 47 for processing the last command accepted or to the address of the first instruction of the programme 44 for controlling the commands received. The last instruction of the programme 47 precedes the first instruction of the delay programme 46.

The programme 44 for controlling the commands received comprises several sub-programmes 50,51,52,53,54,55,56, also illustrated in FIG. 2. The first instruction of the programme 44 is the first instruction of sub-programme 50 for ascertaining the position of the switches of the general control device (position memorized previously in programme 42). The last instruction of the sub-programme 50 is a conditional call instruction to the address of the first instruction of sub-programme 53 for ascertaining the "STOP" function coming from the general control device, or to the address of the first instruction of sub-programme 51 for ascertaining the "STOP" function coming from the corresponding individual control device.

The last instruction of sub-programme 53 is a conditional call instruction to the address of the first instruction of sub-programme 55 for memorizing the command given by the general control device, or to the address of the first instruction of sub-programme 54 for processing the "STOP" function coming from the general control device. The last instruction of sub-programme 54 precedes the first instruction of the scanning programme 41.

The last instruction of sub-programme 51 is a conditional call instruction to the address of the first instruction of sub-programme 56 for processing the "STOP" function, coming from the corresponding individual control device, or to the address of the first instruction of sub-programme 52 for memorizing the command given by the corresponding individual control device. The last instruction of sub-programme 56 precedes the first instruction of the scanning programme 41.

The last instruction of sub-programme 55 precedes the first instruction of programme 45 for processing the "accepted command".

The last instruction of sub-programme (52) precedes the first instruction of programme 45 for processing the "accepted command".

The "accepted command" processed by the programme 45 is either the general command memorized in sub-programme 55, or the individual command memorized in sub-programme 52, depending on each individual case. The last instruction of programme 45 precedes the first instruction of the delay programme 46. This programme 46 is intended to pre-position, then decrement a delay counter provided in the corresponding microcalculator 1. The last instruction of programme 46 precedes the first instruction of the scanning programme 41.

In the present invention, an individual "STOP" command is given by pressing simultaneously on the switches MI and DI and a general "STOP" command is given by pressing simultaneously on the switches MG and DG.

When inoperative, the microcalculator 1 sends sequential pulses to the scanning outputs R0-R1, through the intermediary of the scanning programme 41. After the microcalculator 1 is initiated, the output terminal R8 is permanently at state 1 and the output terminals R6-R7 are at state zero. The supply terminals Vss and Vdd are permanently supplied with power. The scanning programme 41, at the same time that it sends pulses, collects on the one hand at the input terminal K1 information relating to the position of the two switches MI, DI, on the other hand at the input terminals K2,K4, through the intermediary of the input interface 4, information relating to the switches MG, DG, finally at the input terminal K8, information relating to a time base constituted by the frequency of the power supply system 12.

When the operator actuates the switch MI of an individual control device 11 for example, without at the same time actuating the switches DI, MG or DG, the input terminal K1 is connected to the output terminal R0 and the scanning programme 41 reads this closure of the switch MI and reads the openings of the switches DI, MG, DG and memorizes them by means of the programme 42 for memorizing the positions of the switches. The programme 43 ascertains the fact that at least one switch, in this case MI has been actuated. The programme 44 for controlling the commands received then ascertains, by means of the sub-programme 50, that there is no command coming from the general control device 17, then ascertains, by means of the sub-programme 51 that there is no "STOP", since only the switch MI has been actuated. The sub-programme 52 memorizes the ascent command given by the individual control device 11. The programme 45 for processing the accepted command reads the previously memorized ascent command and supplies power to the output terminal R7, which, through the intermediary of the output interface 2, controls the rotation of the motor 15 in a direction causing the ascent of the blind or the like. Then, the delay programme 46 pre-positions the delay counter of the individual delay device, at a value determining the duration of said delay, which is for example 3 minutes. The scanning programme 41 once more reads the position of the switches MI, DI, MG, DG.

As long as the operator continues to actuate the switch MI and solely MI, the linking of the programmes takes place again, as previously. Each time the programme 46 is implemented, it decrements the delay counter upon each change of state occurring at the terminal K8 and the output terminal R7 continues to be supplied with power until the counter reaches zero, which corresponds to the end of the delay period. The motor 15 is then no longer supplied with power.

When the operator releases the switch MI, the programmes 41,42 are implemented as previously, then the programme 43 ascertains the fact that no switch has been actuated. The programme 47 for processing the last accepted command reads the ascent command memorized previously by the sub-programme 52. The delay counter is decremented as mentioned above and the motor 15 stops at the end of the delay.

Each time the delay counter reaches zero, the information previously memorized in the sub-programme 52 is removed.

The operation of the individual control device 11 is similar when it is the switch DI and solely this switch which is actuated. It is the output terminal R6 which is then supplied with power and the motor 15 operates in the opposite direction to the former, corresponding to the descent of the blind or the like.

If, during the rotation of the motor 15 in the ascending direction, controlled previously, the operator presses simultaneously on the switches MI, DI, without pressing either on the switch MG, or on the switch DG, this operation corresponds to a "STOP" command and the rotation of the motor 15 is interrupted immediately. In fact, after the implementation of the programmes 41 and 42, the programme 43 ascertains the fact that at least one switch, in this case MI and DI, has been actuated. The sub-programme 50 then ascertains that there is no command coming from the general control device 17, then the sub-programme 51 ascertains that there is a "STOP" command, since the switches MI and DI are actuated simultaneously. The sub-programme 56 for processing the individual "STOP" command resets the delay counter to zero and the power supply to the motor 15 is interrupted instantaneously.

When the counter is reset to zero, the information previously memorized in the sub-programme 52 is removed.

When the operator actuates a switch of the general control device, for example DG which corresponds to a descent command for all the blinds or the like, the programmes 41,42, 43,50 of each microcalculator 1 are implemented as mentioned previously. The sub-programme 50 ascertains that there is a command coming from the general control device 17, then the sub-programme 53 ascertains that there is no general "STOP" command. The sub-programme 55 memorizes the descent command given by the general control device 17. The programme 45 reads the descent command thus memorized and supplies the output terminal R6 of each individual control device. All the motors rotate in the descent direction until the end of the delay period, as described previously in the case of a command coming from an individual control device.

As long as the operator continues to actuate the switch DG and solely DG, the linking of the programmes takes place once more as previously in each microcalculator 1. Each time the programme 46 is implemented, it decrements the corresponding delay counter and the corresponding output terminal R6 continues to be supplied with power until the said counter reaches zero. All the motors are thus stopped at the end of the delay period.

When the operator releases the switch DG, in each microcalculator 1, the programmes 41,42 are implemented as previously. The programme 43 ascertains the fact that no switch has been actuated, then the programme 47 for processing the last command received reads the descent command memorized previously by the sub-programme 55. The delay counter is decremented as mentioned above, until the end of the delay period. Simultaneously, the information previously memorized in the corresponding sub-programmes 55 is removed.

If, after releasing the switch DG, when all the motors are still operating, the operator presses simultaneously on the switches MI and DI of any one of the individual control devices 11, this "STOP" command of the corresponding motor is implemented successively by the programmes 41,42,43,50,51,56 of the corresponding microcalculator, as described previously. Only the corresponding motor 15 stops.

If, after releasing the switch DG, when all the motors are still operating, the operator presses on the switch MI of any one of the individual control devices 11, this ascent command for the corresponding blind is implemented by the successive programmes 41,42,43,50,51,52,45 and 46 as described previously. The corresponding motor 15 thus operates in the opposite direction to the former. When the operator releases the switch MI, successive programmes 41,42,43,47,46 ensure the rotation of the motor until the end of the delay period.

The operation of all the individual control devices 11 is similar when it is the switch MG and only the latter which is actuated. It is the output terminal R7 of each microcalculator 1 which is supplied with power and all the motors 15 operate in the reverse direction to the former, corresponding to the ascent of the blinds or the like.

If, during the rotation of all the motors 15, in the descent direction for example, the operator presses simultaneously on the switches MG and DG solely, this operation corresponds to a general "STOP" command and the rotation of all the motors 15 is interrupted immediately. In fact, in each microcalculator 1, after implementation of the programmes 41,42, the programme 43 ascertains the fact that at least one switch, in this case two switches MG and DG, has been actuated. The sub-programme 50 ascertains that there is a command coming from the general control device 17, then the sub-programme 53 ascertains that there is a "STOP" command, and since the switches MG and DG are actuated simultaneously. Sub-programme 54 for processing the general "STOP" command resets the delay counter to zero and the supply of power to each corresponding motor 15 is interrupted instantaneously. Simultaneously, the information previously memorized in the corresponding sub-programmes 55 is removed.

The above process remains valid in the case where only some motors were operating, in the same direction or otherwise, at the time when the operator presses simultaneously on the switches MG and DG.

It may happen that an operator actuates at least one switch of the general control device whilst another operator actuates at least one switch of one of the individual control devices. There is thus simultaneously a command from this individual control device with a command from the general control device. It is the command given by the general control device which is carried out.

Thus, in a first example, the first operator presses on the switch DG of the general control device at the time when the second operator presses on the switch MI of an individual control device. These two simultaneous commands first of all cause the implementation of the same programmes 41,42,43 in all the microcalculators 1, as described previously. Then, subprogramme 50 ascertains that there is a command coming from the general control device. Sub-programmes 53,55,45 and 46 are then implemented as if only the switch DG had been actuated, as described previously. All the motors 15 are thus controlled in the descent direction as long as the first operator continues to actuate the switch DG. If the first operator releases the switch DG, when the second operator continues to operate the switch MI, only the motor controlled by this switch MI rotates in the ascent direction, the corresponding microcalculator 1 implementing the programmes 41,42,43,50,51, 52,45,46 in succession, as described previously. When the second operator releases the switch MI, the corresponding motor continues to rotate in the ascent direction until the end of the delay period, the corresponding microcalculator 1 implementing programmes 41,42,43,47,46 in succession, as described previously. In this case, programme 47 processes the last command received, namely an ascent command, memorized previously in sub-programme 52. During this period of time, all the other motors continue to operate in the descent direction until the end of the delay period, each corresponding microcalculator 1 implementing programmes 41,42,43,47,46 in succession. In this case, the programme 47 of each corresponding microcalculator 1 processes the last command received, namely a descent command, memorized previously in sub-programme 55.

The implementation of the programmes would be the same if the switches MG and DI were actuated simultaneously.

In a second example, the first operator presses on the switch DG at the time when the second operator presses on the two switches MI and DI of an individual control device in order to bring about the "STOP" function. As in the first example described above, all the motors 15 are controlled in the descent direction, as long as the first operator continues to actuate the switch DG. If this switch DG is released when the switches DI and MI are still actuated, only the motor controlled by the switches DI and MI stops immediately. The corresponding microcalculator 1 implements programmes 41,42, 43,50,51,56 in succession, as described previously. During this time, all the other motors continue to operate in the descent direction until the end of the delay period, as in the first example described above.

In the two examples described above, if the second operator respectively releases the switch MI, or the switches MI and DI, before the first operator releases the switch DG, all the motors 15 continue to rotate in the same direction corresponding to the descent direction, even after the switch DG has itself been released. All the microcalculators 1 successively implement programmes 41,42,43,47,46, after this release of the switch DG.

In a third example, the first operator presses on the two switches DG and MG at the time when the second operator presses for example on the switch MI of an individual control device. As long as the two switches MG and DG are actuated, all the motors are stopped. All the microcalculators 1 successively implement the programmes 41,42,43,50,53,54 as described previously, sub-programme 50 of each of the latter having ascertained that there was a "STOP" command coming from the general control device. The command produced by the action on the switch MI is thus not implemented. If the switches MG and DG are released whilst the switch MI is still actuated, only the motor controlled by this switch MI rotates in the ascent direction, the corresponding microcalculator 1 successively implementing programmes 41,42,43,50,51,52. During this time, all the other motors remain inoperative.

In this third example, if the second operator releases the switch MI before the first operator releases the switches MG,DG, all the motors remain inoperative, even after release of the switches MG,DG.

Figure 3:
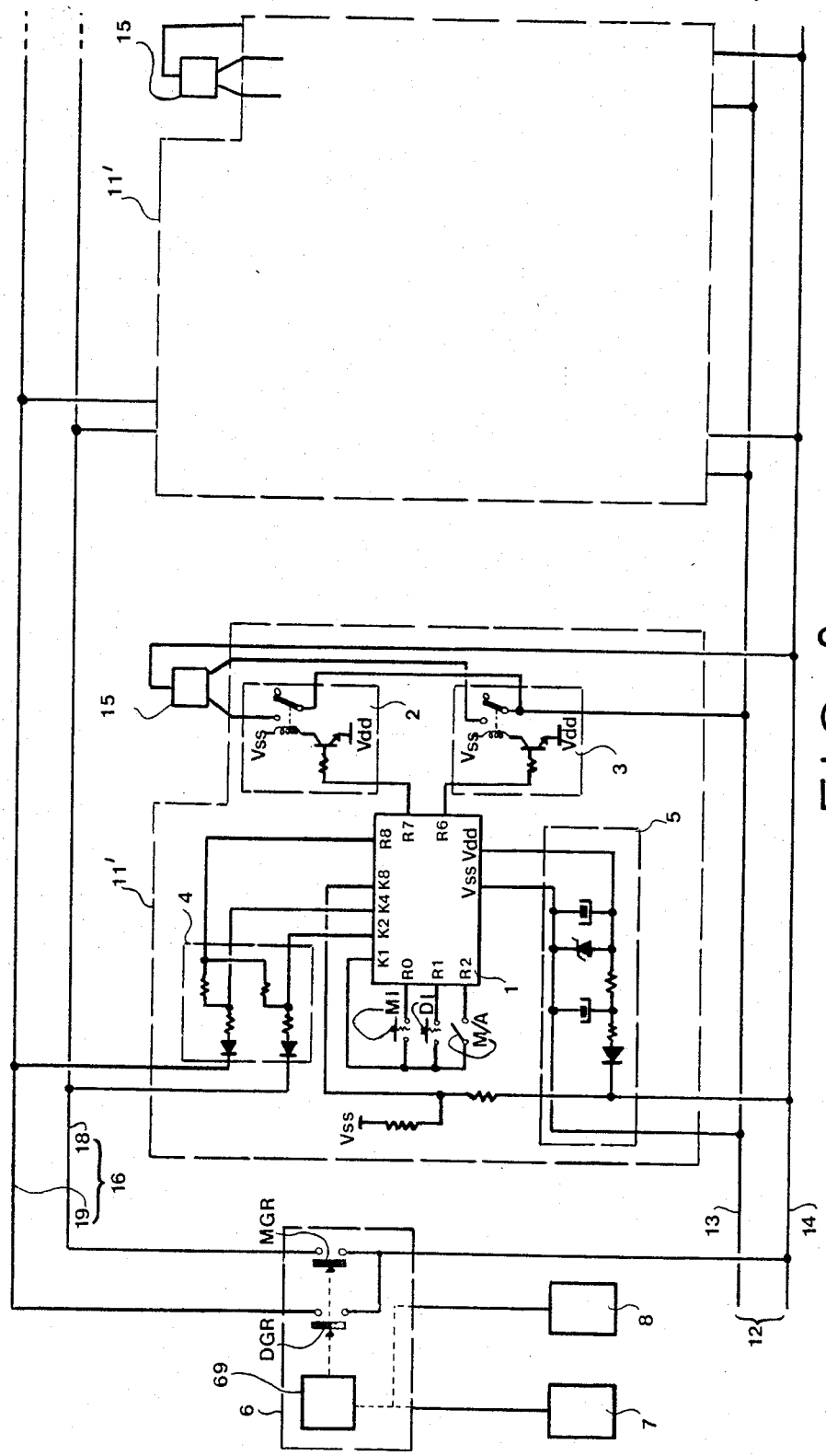
FIG. 3 shows the wiring diagram of a second embodiment of the invention.

In the second embodiment, illustrated diagrammatically in FIG. 3, the switching means of each individual control device 11' comprise an additional M/A (Manual/Automatic) switch, for example having two fixed positions. The first terminal of this M/A switch is connected to an output terminal R2 of the corresponding microcalculator 1 and its second terminal is connected to the input terminal K1 of the same microcalculator 1. On the other hand, the manual switches MG and DG of the general control device 17 of the first embodiment (FIG. 1) are replaced by an automatic general control device 6 comprising switches controlled automatically, for example by a pick-up 7 for sunlight and by a wind-gauge pick-up 8. In this example, the switches controlled automatically are constituted by the contacts MGR (ascent) and DGR (descent) of respectively two relays, namely an "ascent" relay and a "descent" relay. The general control device 6 also comprises priority logic 69 provided for establishing priority between several commands given by the pick-ups 7 and 8. Priority is granted in this example to the command given by the wind pick-up 8.

The function of this pick-up 8 is to close the switch MGR (ascent), whilst preventing, if necessary, the closure of the switch DGR (descent) by the sunlight pick-up 7. The function of the priority logic 69 is also to maintain the closure of the switch MGR and the opening of the switch DGR, as long as the wind pick-up 8 gives the said logic circuit 69 an indication of the wind speed which is greater than a predetermined threshold and at which the blinds for example may be damaged.

The function of the sunlight pick-up 7 is either to close the switch MGR (ascent), or to close the switch DGR (descent), depending on whether the level of sunlight is less than or greater than a predetermined value. The function of the priority logic circuit 69 is also to maintain the closure, either of the switch MGR, or of the switch DGR, depending on each individual case, for a short period of time, for example half a second, in order to control all the motors, in a manner without any priority.

Figure 4:
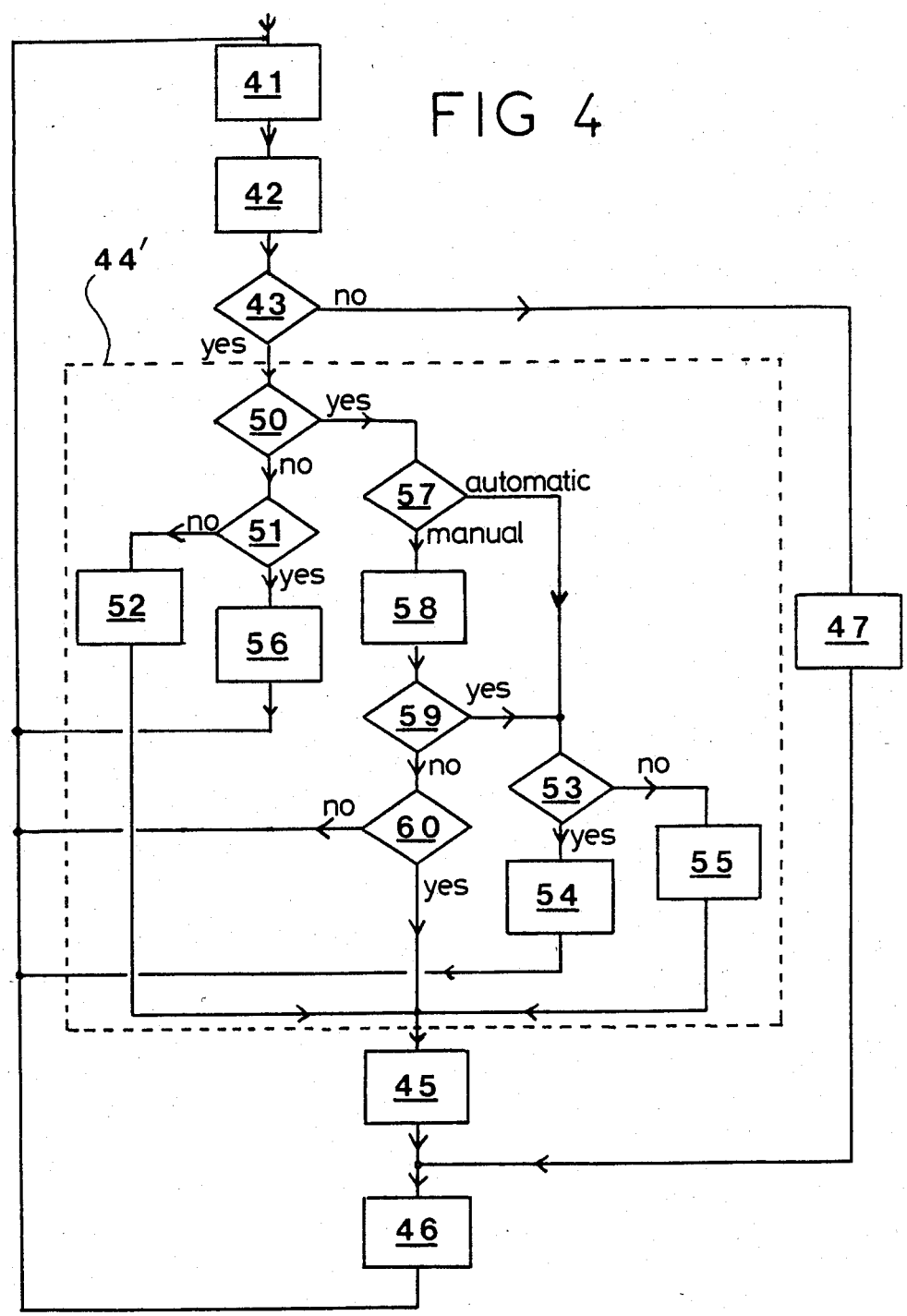
FIG. 4 is a diagram of the programmes contained in the nonvolatile memory of the microcalculator constituting the logic processing unit, in the same second embodiment.

As shown diagrammatically in FIG. 4, the non-volatile memory of the microcalculator 1 contains the same programmes 41 to 47 as in the first embodiment (FIG. 2), with the exception of the programme 44 which is replaced by a programme 44'. This programme 44' comprises all the sub-programmes 50 to 56 of programme 44 and furthermore the following sub-programmes: a sub-programme 57 for ascertaining the position of the additional M/A (manual/automatic) switch, a "waiting" sub-programme 58, a sub-programme 59 for ascertaining the continuation of the command given by the general control device 6, after this waiting period, and a sub-programme 60 for ascertaining the existence of a previous command given by the corresponding individual control device, memorized in sub-programme 52.

Programme 44' is also illustrated in FIG. 4. The last instruction of sub-programme 50 is a conditional call instruction to the address of the first instruction of sub-programme 51 (as in the first embodiment), or to the address of the first instruction of sub-programme 57 for ascertaining the position of the M/A switch. The last instruction of sub-programme 57 is a conditional call instruction to the address of the first instruction of sub-programme 53 (existing in the first embodiment), or to the address of the first instruction of the "waiting" sub-programme 58. This "wait" has a duration of 1 second for example. The last instruction of sub-programme 58 precedes the first instruction of sub-programme 59 for ascertaining that the command given by the general control device 6 is maintained, after the waiting period. The last instruction of sub-programme 59 is a conditional call instruction to the address of the first instruction of sub-programme 53 (existing in the first embodiment) or to the address of the first instruction of sub-programme 60 for ascertaining the existence of a preceding command given by the corresponding individual control device 11', memorized in sub-programme 52. The last instruction of sub-programme 60 is a conditional call instruction to the address of the first instruction of the scanning programme 41, or to the address of the first instruction of programme 45.

An open position of a M/A switch corresponds to an "automatic" mode of operation of the corresponding individual control device 11'. In this position, any command given by the general control device 6 is accepted by the corresponding individual control device. The operation of the latter is thus identical to that described previously in the first embodiment (FIGS. 1 and 2), in which there is no additional M/A switch. Sub-programme 57 in fact ascertains that the additional M/A switch is open, thus in the "automatic" position. The linking of the programmes thus takes place as described previously: 53 then 54 or 55 etc.

If the level of sunlight becomes greater than a predetermined value, the sunlight pick-up 7 controls the priority logic circuit 69 which actuates the switch DGR (descent) for a period of half a second. Conversely, if the level of sunlight becomes less than the predetermined value, it causes the actuation of the switch MGR (ascent) for half a second. Everything takes place as if an operator had pressed manually for half a second on the switch DG, respectively MG, of the first embodiment. Such a command given by a switch MGR or DGR may be cancelled or reversed by an operator acting on the switches DI and MI, as in the case of the first embodiment (FIGS. 1 and 2).

If the wind pick-up 8 detects a wind speed greater than a predetermined threshold, it controls the priority logic circuit 69 which actuates the switch MGR (ascent). All the motors are thus actuated in a direction corresponding to the ascent of the blinds. As long as the pick-up 8 detects a speed greater than the predetermined threshold, the switch MGR remains actuated and an action on at least one of the switches MI or DI is not taken into account by the corresponding individual control device 11', since the command given by the wind pick-up 8 always takes priority, since the function of this pick-up is to ensure the safety of the installation, for example of a blind. The operation is identical to that of the first embodiment described previously (FIGS. 1 and 2) when the operator maintained his action on the switch MG.

A closed position of a M/A switch corresponds to a "manual" mode of operation of the corresponding individual control device. "Manual" signifies "non-automatic" throughout the present description.

The operation of each individual control device is identical to that previously described in the first embodiment (FIGS. 1 and 2), as regards the commands able to be given by the corresponding switches MI and DI. Programmes 41,42,43,50,51,52,45,46 or programmes 41,42,43,50,51,56 or programmes 41,42,43,47,46 are carried out in succession as described in the first embodiment.

In the same closed position of the M/A switch, a command given by the general control device 6 is not always accepted. It is accepted if one of the switches MGR or DGR at least is kept actuated for a period of time greater than the "waiting" period determined by sub-programme 58. It is not accepted in the opposite case.

In one example of operation, when the level of sunlight becomes greater than the predetermined value, the sunlight pick-up 7 controls the priority logic circuit 69 which actuates the switch DGR (descent) for half a second. This command given by the sunlight pick-up 7 is not carried out since its duration is less than that of the "waiting" period (1 second). In fact, after carrying out programmes 41,42 and 43 as in the first embodiment, programme 44' for controlling commands received ascertains, by means of sub-programme 50, if there is a command coming from the general control device 6, then ascertains, by sub-programme 57, that the additional M/A switch is in the "manual" position. Sub-programme 58 causes a "wait" of 1 second, then sub-programme 59 ascertains that the command given previously by the general control device 6 no longer exists since the said command lasted for only half a second. Sub-programme 60 ascertained that there was no previous command given by the corresponding individual control device. Then, the scanning programme 41 is once more carried out.

Conversely, a level of sunlight less than the predetermined value causes the actuation of the switch MGR (ascent) for half a second. This command is not carried out since its duration is also less than that of the "waiting" period. Programmes 41,42,43,50,57,58,59,60 are carried out in succession.

An action on a switch MI or DI, preceding or following the command given by the switch DGR or MGR, is taken into account by the corresponding individual control device 11'. Thus, an action on a switch DI (descent) causes the successive carrying-out of the programmes 41,42,43, then 50,51,52,45 and 46, as described previously in the case of the first embodiment (FIGS. 1 and 2). If, at this time, the wind pick-up 8 controls the priority logic circuit 69, the latter actuates the switch MGR (ascent) as long as the wind pick-up 8 indicates a wind speed greater than the predetermined threshold. The command given by the switch MGR is carried out by all the individual control devices 11', since its duration is greater than that of the "waiting" period (1 second).

At the same time, the commands coming from all the switches MI or DI are not taken into account. In fact, after carrying out the programmes 41,42 and 43, the programme 44' for controlling the commands received, ascertains by means of the sub-programme 50 that there is a command coming from the general control device 6, then ascertains by means of a sub-programme 57 that the switch M/A is in the "manual" position. Sub-programme 58 causes a "wait" of 1 second, then sub-programme 59 ascertains that the command given by the general control device 6 still exists, since said command is maintained as long as the wind speed is excessive. Sub-programme 53 ascertains that there is no general "STOP" command. Sub-programme 55 memorizes the ascent command given by the general control device 6. The programme 45 reads the ascent command memorized in this way and supplies power to the output terminal R7 of each individual control device 11'. All the motors 15 operate in the ascent direction until the end of the delay period.

Even after the end of this delay period (in this example 3 minutes), a command given by a switch DI (descent) has no effect, as long as the switch MGR (ascent) is kept closed.

At the instant when the wind pick-up 8 indicates a wind speed less than the predetermined threshold, the priority logic circuit 69 releases the switch MRG. The commands given by all the switches DI may once more be taken into account. In fact, the programmes may thus take place as in the case where there is no command given by the general control device 6.

Without diverging from the scope of the present invention, a M/A switch could be used in the first embodiment (FIGS. 1 and 2) with a general control device 17, constituted solely by two switches MG and DG. In this case, if these switches MG and DG are push button switches, with a momentary position, the individual control devices 11 do not accept brief commands (less than 1 second in this example) given by the general control device 17, if their respective M/A switches are in the "manual" (closed) position. If the switches MG and DG are switches having fixed positions, the commands which they give are maintained, thus accepted by all the individual control devices, whatever the position of the corresponding additional M/A switches.

Figure 5:
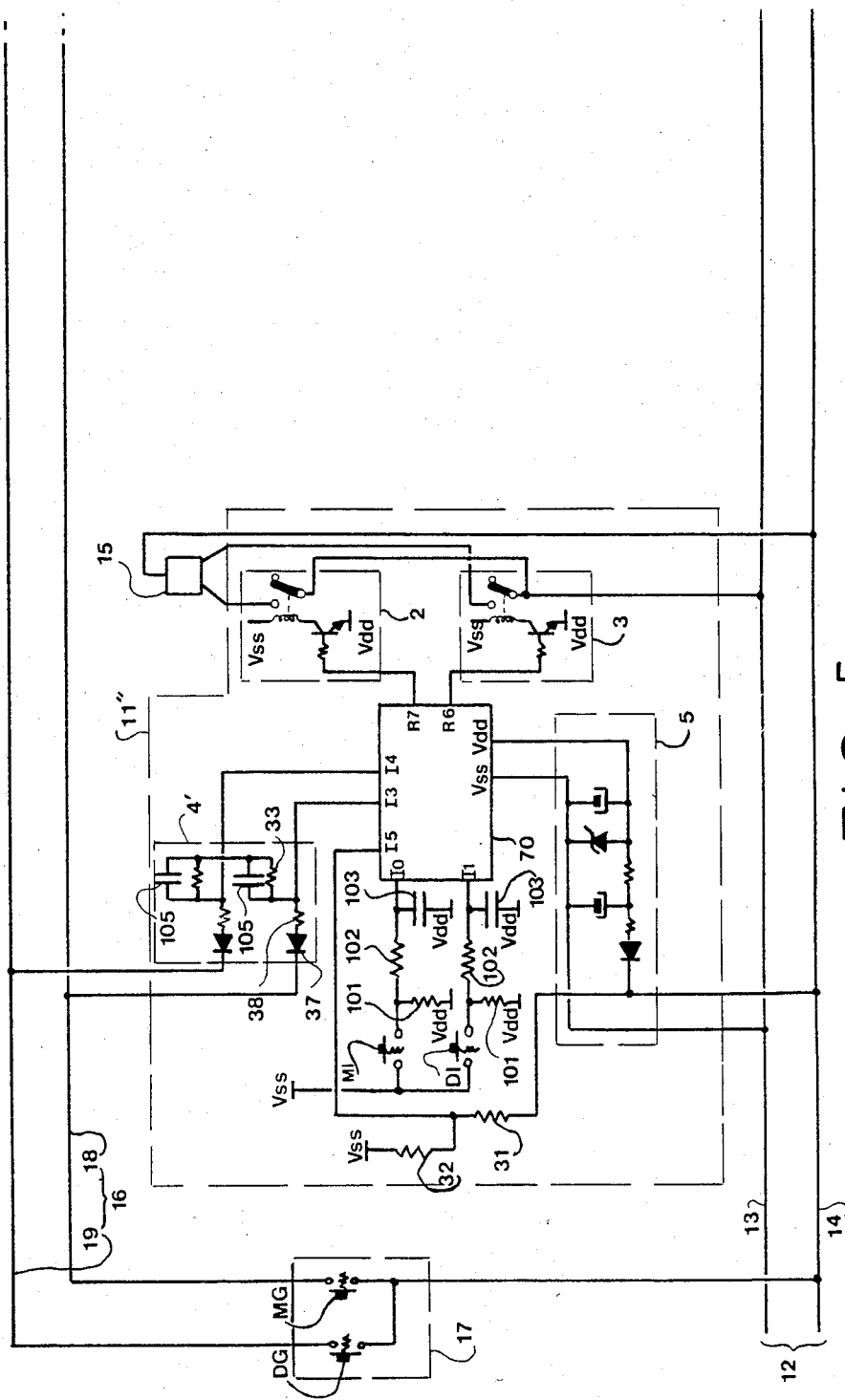
FIG. 5 shows the wiring diagram of a third embodiment of the invention.
Figure 6:
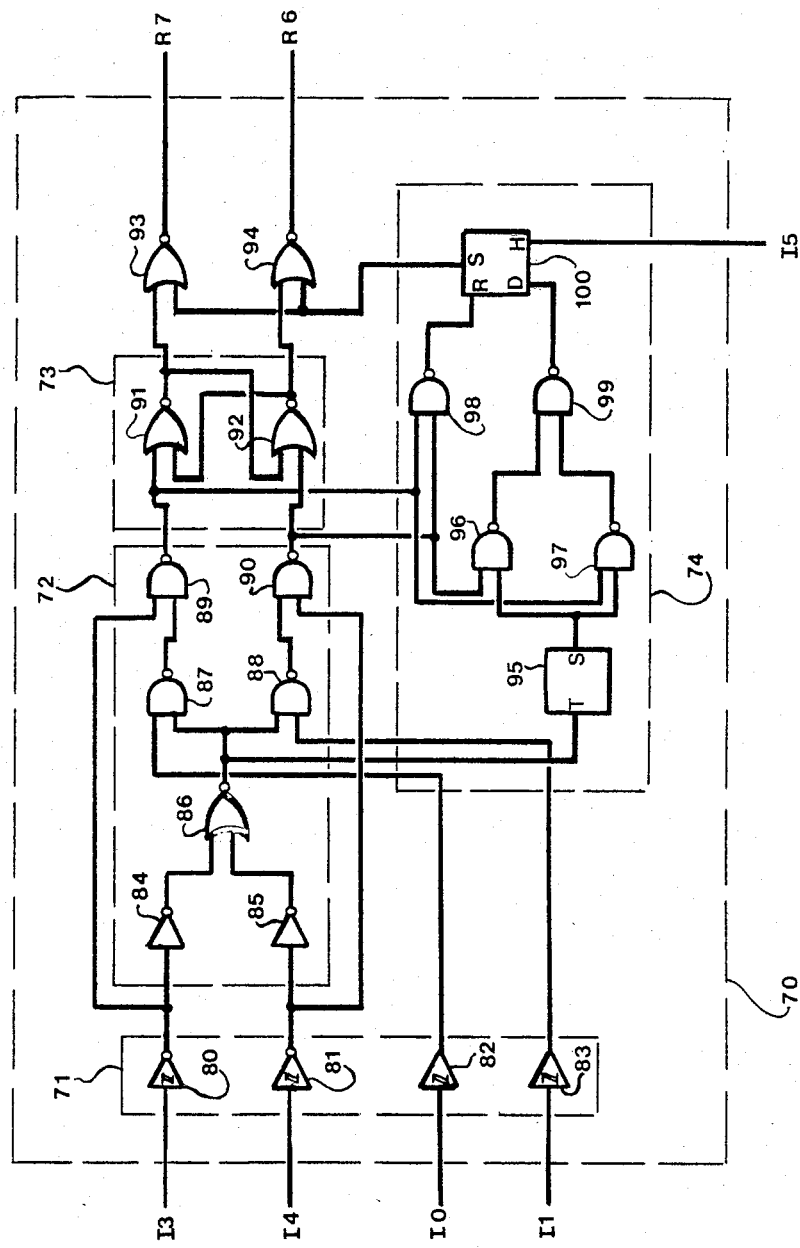
FIG. 6 shows diagrammatically the logic circuit constituting the logic processing unit, in the same third embodiment.

In the third embodiment of the invention, shown diagrammatically in FIG. 5, the microcalculator 1 which constitutes the logic processing unit, in the two first embodiments, is replaced by a logic circuit 70. The latter comprises a first group of two input terminals I0 and I1 to which the switches MI and DI are respectively connected. It also comprises a second group of two input terminals I3 and I4 respectively connected to the switches MG and DG of the general control device, through the intermediary of an input interface 4' similar to that of the two first embodiments. It also comprises, in each individual control device 11", two output terminals R7 and R6 connected to the receiver 15 through the intermediary of output interfaces 2 and 3 already described previously (FIGS. 1 and 3). It also comprises an input terminal I5 connected to the lead 14, through the intermediary of a system of resistors 31-32 serving to cause the voltage at the input I5 to drop. This connection makes it possible to use for example the alternating power supply system as a time base for counting the delay in the operation of the motor 15. The logic circuit 70 also comprises two power supply terminals Vss and Vdd. The second terminals of MI and DI are connected to the terminal Vss.

The logic circuit 70 proper comprises a logic circuit 71 for reading the position of the switches MI, DI, MG, DG given by the voltage existing respectively between the terminals I0, I1,I3,I4 and the terminal Vdd. It is this logic circuit 71 which comprises input terminals I0,I1-,I3,I4. It is constituted for example by "Schmitt triggers" 80,81,82,83. The first two have an inverting output. Their inputs are respectively connected to the input terminals I3 and I4. The last two have a non-inverting output. Their inputs are connected respectively to the input terminals I0, I1.

This logic reading circuit 71 is connected to a priority logic circuit 72 provided in order to determine, amongst the commands given by the switches MI, DI, MG, DG, the one which is to be accepted, in the case where several commands are given simultaneously.

The priority logic circuit 72 comprises two inverting gates 84 and 85, the inputs of which are respectively connected to the outputs of the triggers 80 and 81 and the outputs of which are connected to two inputs of a NOR-gate 86. It also comprises two NAND-gates 87 and 88 with two inputs. One input of each is connected to the output of the NOR-gate 86. The other input of the NAND-gate 87 is connected to the output of the trigger 82. The other input of the NAND-gate 88 is connected to the output of the trigger 83. The outputs of the NAND-gates 87 and 88 are connected respectively to one of the inputs of two NAND-gates 89 and 90 with two inputs. The second inputs are connected respectively to the outputs of the triggers 80 and 81.

The priority logic circuit 72 is connected to a memorization logic circuit 73 provided for memorizing the accepted command and controlling or not controlling one of the output terminals R6 or R7 of the logic circuit 70.

The memorization logic circuit 73 comprises two NOR-gates 91 and 92 operating as a flip-flop RS, one input of each being connected to the output of the other. The other input of the NOR-gate 91 is connected to the output of the NAND-gate 89. The other input of the NOR-gate 92 is connected to the output of the NAND-gate 90.

The logic circuits 72 and 73 are connected to a delay logic circuit 74.

This delay logic circuit 74 comprises a monostable logic circuit 95, whereof the input T is connected to the output of the NOR-gate 86. This monostable circuit is constituted in order to be able to be tripped by a state zero at its input terminal T and in order that its output S passes to state zero throughout the entire period of said monostable. This monostable circuit 95 could be produced for example by means of an integrated circuit bearing the reference NE555 of "Signetics", or of an integrated circuit bearing the reference SN74121 or the like of "Texas Instruments". It also comprises two NAND-gates 96 and 97 with two inputs. One input of each is connected to the output S of the monostable circuit 95. The other respective inputs are connected respectively to the output of the NAND-gates 90 and 89 and to the two inputs of a NAND-gate 98 whereof the output is connected to the input R, for resetting a delay logic circuit 100 to zero. The outputs of the NAND-gates 96 and 97 are connected respectively to the two inputs of a NAND-gate 99 whereof the output is connected to the tripping input D of the delay logic circuit 100. The latter also comprises a clock input H, connected to the input terminal I5 and an output S connected to one of the two inputs of two NOR-gates 93 and 94, whereof the second inputs are respectively connected to the outputs of the gates 91 and 92. The outputs of the gates 93 and 94 are connected respectively to the output terminals R7 and R6. The delay circuit 100 is constituted in order to be able to be tripped by a state 1 at its tripping input terminal D, in order to be able to be reset to zero by a state zero at its input R for resetting to zero and in order to count a predetermined number of pulses coming from its input H. The output S of the said delay circuit 100 is arranged to pass to the state zero when the circuit 100 is tripped and to pass to the state 1 when the delay period is terminated. This delay circuit 100 may be produced for example by means of integrated circuits bearing the reference MC 14541 of "Motorola Inc.".

Each input interface 4' differs from an interface 4 (FIGS. 1 and 3) by the fact that it comprises a capacitor 105 connected in parallel with each resistor 33, serving to eliminate mechanical rebounds of the contacts of the switches MG and DG.

Each switch MI is connected to the input IO by a resistor 102, the input terminal IO being connected to the terminal Vdd by means of a capacitor 103, the switch MI being connected to the terminal Vdd by a resistor 101. The resistors 101,102 and the capacitor 103 constitute an antirebound filter for the contacts of the switch MI. The switch DI is connected in the same manner.

All the other constituent parts are identical to those of the first embodiment (FIG. 1).

When an operator actuates solely a switch MI, the potential of the terminal IO is brought to that of the terminal Vss, the output of the trigger 82 passing to the state 1. Since the potential of the terminals I3 and I4 is zero (no command from the general control device), the output of the gate 86 is thus at state 1 and the output of the gate 87 passes to state zero. The output of the gate 89 passes to state 1, which causes the output of the gate 91 to change to state zero. Since the outut of the gate 86 is at state 1, the monostable circuit 95 is not tripped and its output S remains at state 1. When the output of the gate 89 is at state 1, the output of the gate 97 passes to state zero and the output of the gate 99 passes to state 1, which initiates the beginning of the delay period (in our example three minutes) by means of the terminal D of the delay circuit 100. At the same time, since the output of the triggers 80,81 and 83 is at state zero, the output of the gate 90 is at state zero, which causes the gate 98 to pass to state 1 and the terminal R of the delay circuit 100, to state 1, which allows the output S to pass to state zero, since the beginning of the delay period has been initiated and the output of the gate 93, to state 1. The motor 15 is thus supplied with power, by means of the output R7, in the ascent direction.

When the switch MI is released, the output of the gate 89 returns to state zero, but the output R7 remains supplied with power as long as the delay period has not finished, since the output of the gate 91 remains at state zero.

At the end of the delay period, the output S of the delay circuit 100 passes from state zero to state 1 and the output of the gate 93 passes to state zero. The output terminal R7 is thus no longer supplied with power.

If, before the end of the delay period, the operator simultaneously actuates the switches MI and DI in order to give a "STOP" command, the outputs of the gates 89 and 90 both pass to state 1 and the output of the gate 98 passes to state zero, which has the effect of resetting the delay period to zero, since the terminal R of the delay circuit 100 is at state zero. When the delay period has been reset to zero, the output S of the delay circuit 100 passes to state 1 and the outputs of the gates 93 and 94 are once more at state zero. The output terminals R6 and R7 are no longer supplied with power and the motor 15 stops.

If, whilst the operator presses on the switch MI (individual ascent), another operator presses on the switch DG (descent) of the general control device, the outputs of the triggers 81 and 82 pass respectively to the state zero and 1. The output of the gate 86 passes to the state zero and the output of the gate 90 passes to the state 1. Since the terminal T of the monostable circuit 95 passes to the state zero, the output S of this circuit 95 passes to the state zero during the period of the monostable circuit 95 (for example 10 ms) and the result of this is that the terminal D of the delay circuit 100 passes to the state zero during this period. This will make it possible to retrip the delay circuit 100. In fact, when the output S of the monostable circuit 95 returns to state 1, the output of the gate 99 passes to state 1, since that of the gate 90 is at state 1, which has the effect of recommencing a delay cycle, since the output of the gate 98 is also at state 1, the output of the gate 89 being at state zero.

When the output of the gate 90 is at state 1, the output of the gate 92 is at state zero and the output of the gate 94 passes to state 1, since the output S of the delay circuit 100 is at state zero. The output R6 is supplied with power and the motor rotates in the direction of the descent.

As long as the operator continues to act on the switch DG, the motor 15 remains supplied with power by the terminal R6 until the end of the delay period of 3 minutes, i.e. until the output S of the delay circuit 100 returns to state 1. The entire device remains in this position as long as the two operators continue to press simultaneously on the switches MI and DG.

When the operator releases the switch DG, the switch MI still being actuated, the trigger 82 is in state 1 and, since the output of the gate 86 is at state 1, the output of the gate 87 passes to state zero and the output of the gate 89 passes to state 1. The outputs of the gates 97,99 and 91 pass respectively to state zero, 1 and zero. The delay circuit 100 is thus tripped by state 1 present at its input D, the effect of which is to cause its output S to pass to state zero and the output of the gate 93 to state 1. The output terminal R7 is thus supplied with power until the end of the delay period. The motor 15 is supplied with power in the ascent direction.

The present invention may be used in particular for controlling electric motors actuating sliding shutters, blinds or the like.

I claim:

1. Apparatus for controlling a plurality of electrical devices each able to occupy at least two states, comprising individual control means connected to a power supply associated respectively with said devices, each individual control means comprising switching means for positioning the corresponding electrical device in any one of its states, and general control means connected to the power supply, comprising switching means for positioning all the electrical devices in any one of their states, characterised in that each individual control means comprises a logic processing unit permanently connected to the power supply and comprising first and second groups of input terminals, the first group of input terminals including at least one input terminal to which is connected the switching means of said individual control means, said logic processing unit also comprising output terminals connected to the corresponding electrical device, the switching means of the general control device being connected to said second group of input terminals provided on each logic processing unit each logic processing unit accepting commands given non-simultaneously by the corresponding individual control means or by the general control means and accepting only the command given by the general control means when such command is given simultaneously with a command from the corresponding individual control means.

2. Apparatus according to claim 1, characterised in that each logic processing unit comprises a micro-calculator including a non-volatile memory containing a scanning programme, a memory programme and a programme for controlling commands given by the control means, operating sequentially, the scanning programme collecting, at the first group of input terminals, information relating to the position of the switching means of the corresponding individual control means and, at the second group of input terminals, information relating to the position of the switching means of the general control means, the memory programme memorizing these positions of the switching means, and the programme for controlling commands ascertaining whether the order comes from the general control means and, if the answer is in the affirmative, implementing the latter immediately without ascertaining if there was also a command coming from an individual control means and, if the answer is in the negative, carrying out the command given by the corresponding individual control device.

3. Apparatus according to claim 1, characterised in that each logic processing unit comprises a reading logic circuit, a priority logic circuit and a memorizing logic circuit, the reading logic circuit reading the position of the switching means and being connected to the priority logic circuit, the priority logic circuit being connected to the memorizing logic circuit and determining, amongst the commands given by the switching means, the one which is to be accepted in the case where several commands are given simultaneously, and the memorizing logic circuit memorizing the command accepted and controlling accordingly one of the output terminals of said logic processing unit.

4. Apparatus according to claim 1, in which the general control means comprises a general priority logic circuit for establishing a priority between several commands given by several pick-ups, characterised in that said general priority logic circuit, depending on the priority given to the pick-ups, automatically actuates the switching means of the general control means, for a period of time respectively greater or less than a predetermined value.

5. Apparatus according to claim 1, 2 or 3, characterised in that the individual control means comprise at least one additional switching means for causing the corresponding logic processing unit in a certain position to refuse a command given by the general control means if the duration of this command is less than a predetermined value.

6. Apparatus according to claim 1, 2 or 3, in which the electrical devices comprise electric motors, the motors comprising an automatic stopping device and delay means provided for stopping them in the case of unsatisfactory operation of the said automatic stopping device, characterised in that each individual control means comprises individual delay means actuated each time the rotation of the corresponding motor is controlled by the said individual control means or by the general control means.

* * * * *